(12) United States Patent
Huerta-Ochoa et al.

(10) Patent No.: US 11,039,715 B2
(45) Date of Patent: Jun. 22, 2021

(54) FOOD PROCESSING MACHINE ADAPTIVE TO FOOD LOAD

(71) Applicant: ILLINOIS TOOL WORKS INC., Glenview, IL (US)

(72) Inventors: Ruben T. Huerta-Ochoa, Troy, OH (US); Thomas P. Jones, Wilmington, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 372 days.

(21) Appl. No.: 16/026,152

(22) Filed: Jul. 3, 2018

(65) Prior Publication Data
US 2019/0008325 A1    Jan. 10, 2019

Related U.S. Application Data

(60) Provisional application No. 62/528,606, filed on Jul. 5, 2017.

(51) Int. Cl.
*A47J 43/044* (2006.01)
*A47J 43/07* (2006.01)
(Continued)

(52) U.S. Cl.
CPC ............. *A47J 43/044* (2013.01); *A47J 43/06* (2013.01); *A47J 43/0705* (2013.01);
(Continued)

(58) Field of Classification Search
CPC ............ A47J 2043/04463; A47J 43/044; A47J 43/06; A47J 43/0705; A47J 43/0711; A47J 43/082; B01F 13/1041; B01F 15/00201; B01F 15/00311; B01F 15/00318; B01F 15/00389; B01F 2013/108;
(Continued)

(56) References Cited

U.S. PATENT DOCUMENTS 2,728,368 A    12/1955    van Guilder
4,568,193 A    2/1986    Contri
(Continued)

FOREIGN PATENT DOCUMENTS

DE    202006014236    5/2007
EP    2767204    8/2014
(Continued)

OTHER PUBLICATIONS

PCT, International Search Report and Written Opinion, International Application No. PCT/US2018/040673; dated Dec. 3, 2018, 20 pages.

*Primary Examiner* — Tony G Soohoo
(74) *Attorney, Agent, or Firm* — Thompson Hine LLP

(57) ABSTRACT

A food processing machine includes a head extending over a bowl receiving location, the head including an output shaft driven in a planetary manner. At least a first food processing tool and a second food processing tool can be changed in and out of the machine to be driven by the output shaft. A controller and associated tool detection system is configured to identify whether the first food processing tool or the second food processing tool is mounted on the machine and to select a stored load profile that is linked to the identified food processing tool.

16 Claims, 6 Drawing Sheets

(51) Int. Cl.
    *B01F 13/10*      (2006.01)
    *B01F 7/30*       (2006.01)
    *B01F 15/00*      (2006.01)
    *G05B 19/042*     (2006.01)
    *A47J 43/08*      (2006.01)
    *A47J 43/06*      (2006.01)

(52) U.S. Cl.
    CPC ......... *A47J 43/0711* (2013.01); *A47J 43/082* (2013.01); *B01F 7/30* (2013.01); *B01F 13/1041* (2013.01); *B01F 15/00201* (2013.01); *B01F 15/00311* (2013.01); *B01F 15/00318* (2013.01); *B01F 15/00389* (2013.01); *G05B 19/0428* (2013.01); *A47J 2043/04463* (2013.01); *B01F 2013/108* (2013.01); *B01F 2215/0026* (2013.01); *G05B 2219/24015* (2013.01)

(58) Field of Classification Search
    CPC ............... B01F 2215/0026; B01F 7/30; G05B 19/0428; G05B 2219/24015
    See application file for complete search history.

(56) References Cited

U.S. PATENT DOCUMENTS

| | | | | |
|---|---|---|---|---|
| 4,688,728 A * | 8/1987 | Williams | ............. | A47J 43/046 241/101.1 |
| 4,700,903 A * | 10/1987 | Henn | ................ | A47J 43/046 241/101.2 |
| 5,071,077 A * | 12/1991 | Arroubi | ................ | A47J 43/06 241/36 |
| 5,101,704 A | 4/1992 | Jones | | |
| 5,348,393 A * | 9/1994 | Pappas, Jr. | ............ | B01F 7/1605 366/207 |
| 5,524,530 A * | 6/1996 | Nijzingh | ............... | A47J 43/085 241/37.5 |
| 5,591,072 A | 1/1997 | Tweed | | |
| 6,261,161 B1 | 7/2001 | Yan | | |
| 6,481,342 B2 * | 11/2002 | Thackray | ................ | A47J 43/06 241/101.01 |
| 6,709,319 B2 | 3/2004 | Yan | | |
| 7,021,817 B2 * | 4/2006 | Huang | ................. | A47J 43/082 366/331 |
| 7,134,937 B1 | 11/2006 | Chen | | |
| 7,278,779 B2 * | 10/2007 | Beesley | .................. | A47J 43/06 366/192 |
| 7,882,734 B2 * | 2/2011 | Ciancimino | ...... | B01F 15/00201 73/169 |
| 8,043,142 B2 | 10/2011 | Zeeb | | |
| 8,220,383 B2 | 7/2012 | Rummel | | |
| 8,529,118 B2 * | 9/2013 | Davis | .................... | A47J 43/042 366/205 |
| 2009/0084274 A1 * | 4/2009 | Kovacic | ................. | A47J 43/06 99/492 |
| 2009/0097351 A1 | 4/2009 | Li | | |
| 2010/0039883 A1 * | 2/2010 | Foltyn | .................... | G08C 17/00 366/142 |
| 2011/0199852 A1 * | 8/2011 | Martin | ................ | A47J 43/0727 366/113 |
| 2012/0230149 A1 * | 9/2012 | Martin | ................ | A47J 43/0727 366/205 |
| 2014/0286120 A1 * | 9/2014 | Kolar | ................ | B01F 15/00207 366/142 |
| 2016/0256007 A1 * | 9/2016 | Dickson, Jr. | ............. | B01F 7/14 |
| 2018/0085966 A1 | 3/2018 | Schmidt | | |
| 2018/0368622 A1 * | 12/2018 | Widanagamage Don | ................... | A47J 43/07 |
| 2019/0365551 A1 * | 12/2019 | Pathak | .................. | A61B 5/1114 |

FOREIGN PATENT DOCUMENTS

| | | | |
|---|---|---|---|
| WO | WO 2012/058784 | 5/2012 | |
| WO | WO 2015/063513 | 5/2015 | |
| WO | WO 2016/135068 | 9/2016 | |
| WO | WO-2017004661 A1 * | 1/2017 | ............. A47J 43/07 |

* cited by examiner

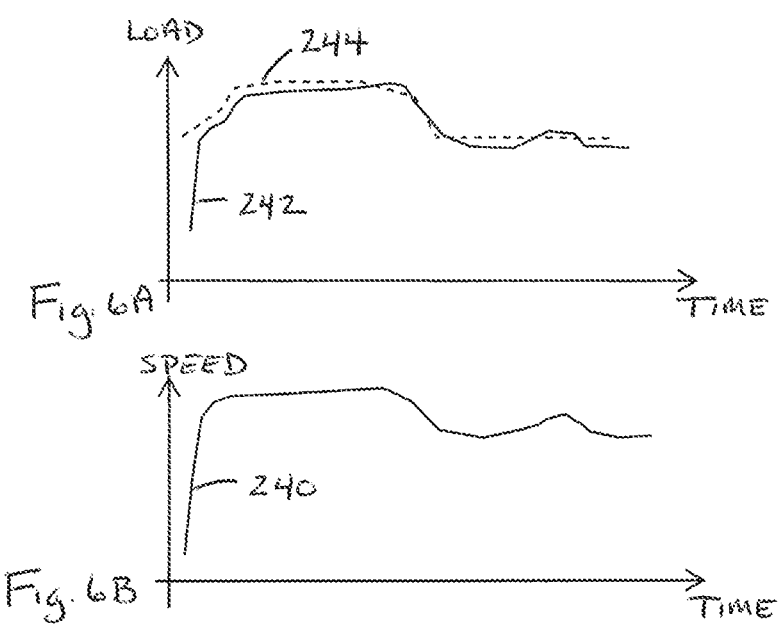

FOOD PROCESSING MACHINE ADAPTIVE TO FOOD LOAD

TECHNICAL FIELD

This application relates generally to commercial food processing machines such as mixing machines of the type used to mix food products and, more specifically, to a food processing machine that automatically adapts operation to food load conditions.

BACKGROUND

Food processing machines incorporate an electric motor, a transmission system, a frame, a food processing plate or set of plates. During the course of operation, the food processing machine will start or stop the electric motor in response to a human-operated lever or machine element to initiate, continue, terminate and/or prevent electric motor operation based on the position of human-operated lever or machine element to operate properly and consistently, along with an interlock system. Such food processing machines generally operate the electric motor and food processing mechanism without regard for the type of food material processed, its consistency, its quantity, and the resistance it offers to the operation of the food processing mechanism. Certain food materials require fast ramp up for consistent food processing/food preparation results, whereas other food materials require slow ramp up to prevent spillage of food materials (powders, fluids, ingredients). Certain food materials require fast ramp down, whereas other food materials require slow ramp down to prevent spillage of food materials, fluids, powders, or ingredients.

Accordingly, it would be desirable to provide a multi-function food processing/food preparation machine with the ability to adjust food processing motor profiles according to the food processing/food preparation function.

SUMMARY

In one aspect, a food processing machine includes a head extending over a bowl receiving location, the head including an output shaft driven in a planetary manner. At least a first food processing tool and a second food processing tool can be changed in and out of the machine to be driven by the output shaft. A controller and associated tool detection system is configured to identify whether the first food processing tool or the second food processing tool is mounted on the machine and to select a stored load profile that is linked to the identified food processing tool.

In one implementation, each food processing tool includes an identifier thereon and the machine includes at least one sensor for detecting the identifier.

In one implementation, each identifier comprises an identification code and the sensor is a code reader.

In one implementation, each identification code is one of an RF identification code, a magnetic identification code or an optical identification code and the code reader is one of an RF code reader, a magnetic code reader or an optical code reader.

In one implementation, the controller is configured to monitor at least one actual load condition during machine operation with the identified food processing tool and to compare the actual load condition with the stored load profile.

In one implementation, a drive motor is linked to drive the output shaft, and the controller is configured to modify operation of the drive motor if the actual load condition is out of bounds relative to the stored load profile.

In one implementation, the controller is configured to reduce a speed of the drive motor if the actual load condition is out of bounds on a high side.

In one implementation, the controller is configured to increase the speed of the drive motor if the actual load condition is out of bounds on a low side.

In one implementation, the controller is configured to stop motor operation if the actual load condition exceeds an upper load limit.

In one implementation, the machine includes a user interface and the controller is configured to utilize an operator input through the user interface to select from among multiple stored load profiles for the identified food processing tool.

In one implementation, the operator input is at least one of a program selection input or a food type input.

In one implementation, a drive assembly includes a coupler engaged with the output shaft to permit the output shaft to rotate freely about its moving axis, wherein the coupler is connected to a crank arm that extends to the food processing tool drive shaft.

In a further aspect, a food processing machine includes a head extending over a bowl receiving location, the head including an output shaft driven in a planetary manner. A first food processing tool is removably connected to be driven by the output shaft. A coupler is engaged with the output shaft to permit the output shaft to rotate freely about its moving axis, wherein the coupler is connected to a crank arm that extends to the drive shaft of the food processing tool. A controller and at least one sensor are provided to identify the first food processing tool when it is connected and to select a stored load profile that is linked to the first food processing tool.

In one implementation, the machine includes at least one load sensor, wherein the controller is configured to monitor at least one actual load condition indicated by the load sensor during machine operation and to compare the actual load condition with the stored load profile.

In one implementation, a drive motor is linked to drive the output shaft, and the controller is configured to modify operation of the drive motor if the actual load condition is out of bounds relative to the stored load profile.

The details of one or more embodiments are set forth in the accompanying drawing and the description below. Other features, objects, and advantages will be apparent from the description and drawing, and from the claims.

BRIEF DESCRIPTION OF THE DRAWINGS

FIGS. 6A-6B show another example of motor speed control based upon load profile.

DESCRIPTION

Figure 1:
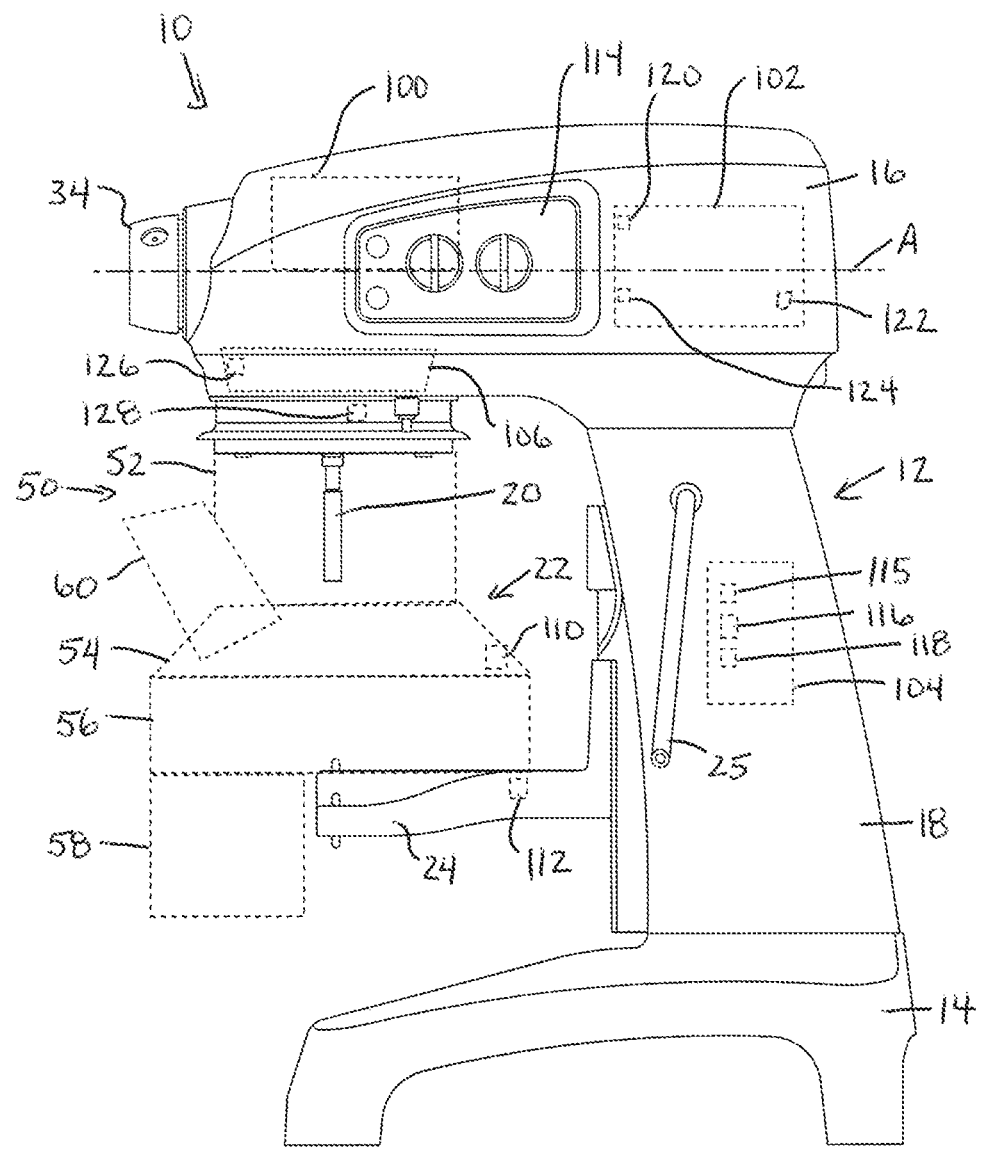
FIG. 1 is a schematic side elevation of a food mixing machine.

Referring to FIG. 1, an exemplary food processing/preparation machine in the form of a commercial mixing machine 10 is shown. Such a machine typically has a mixer body 12 having a base portion 14, a head portion 16 and a support portion 18 (e.g., in the form of a column) connecting the head and base portions in a vertically, spaced-apart relationship. A front-to-back head portion axis A is shown. An output member 20 (e.g., a shaft for receiving a mixer tool, such as a beater or whip) extends downward from the head portion 16 in a direction toward a bowl receiving location 22 formed between arms 24 of a bowl receiving yoke that can be moved up and down relative to the head portion by rotation of the illustrated handle 25 (or alternatively by a power drive) in order to move a bowl (not shown) up and down. A power take off 34 extends outwardly from a front side of the head portion 16 and may take the form of a protruding hub or boss that is adapted for connection to mixer accessories such as meat grinders, slicers, etc. A microprocessor control board 100 is also shown in schematic form, along with a drive motor 102 and motor control unit 104. Collectively, the control components of the machine may be generally referred to as a controller. As used herein, the term controller is intended to broadly encompass any circuit (e.g., solid state, application specific integrated circuit (ASIC), an electronic circuit, a combinational logic circuit, a field programmable gate array (FPGA)), processor (s) (e.g., shared, dedicated, or group—including hardware or software that executes code), software, firmware and/or other components, or a combination of some or all of the above, that carries out the control functions of the apparatus or the control functions of any component thereof.

The drive system, internal of the machine housing, includes the motor 102 linked to the output member 20 (e.g., through a drive train that includes planetary gearing 106) for effecting rotation of the output member about a first axis and orbiting movement of the output member and first axis about a second axis (e.g., a planetary movement or planetary rotation).

In the machine of FIG. 1, no bowl is shown. Instead, a food processor assembly 50 is driven by the motion of the planetary shaft 20 of the mixing machine. The components mount within the confines of the mixer yoke. The assembly includes a main connection housing 52, an intermediate feed section 54, a processing tool section 56 and a eject chute 58. Food is directed down a food chute 60 and then to the processing tool (e.g., cutter, slicer, shredder, etc.) of the attachment section 56, and processed food may exit the food processor via the eject chute 58 substantially parallel with the shaft 20. The processed foods may be collected in pans or bowls located under the food processor assembly and substantially inside the mixer envelope or footprint. The incorporation of the food processor within the mixer envelope frees up kitchen space.

Figure 2:
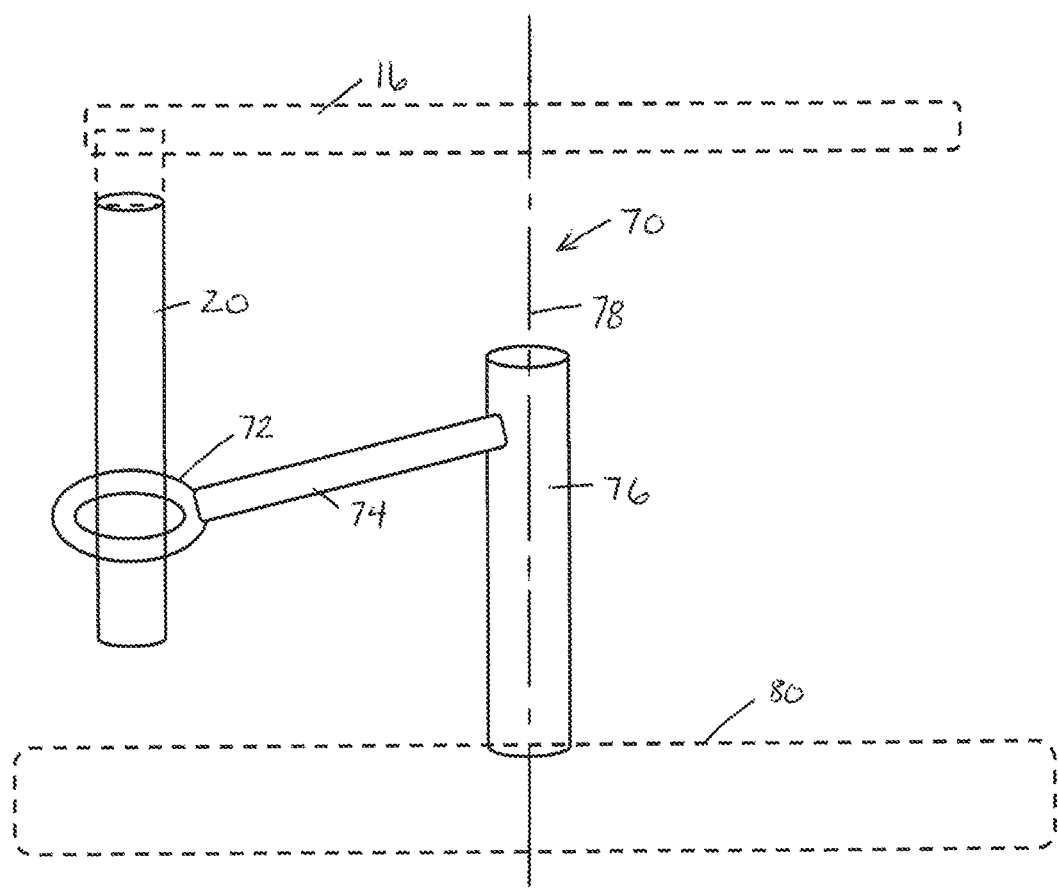
FIG. 2 is a schematic depiction of a food processing system drive assembly.
Figure 3:
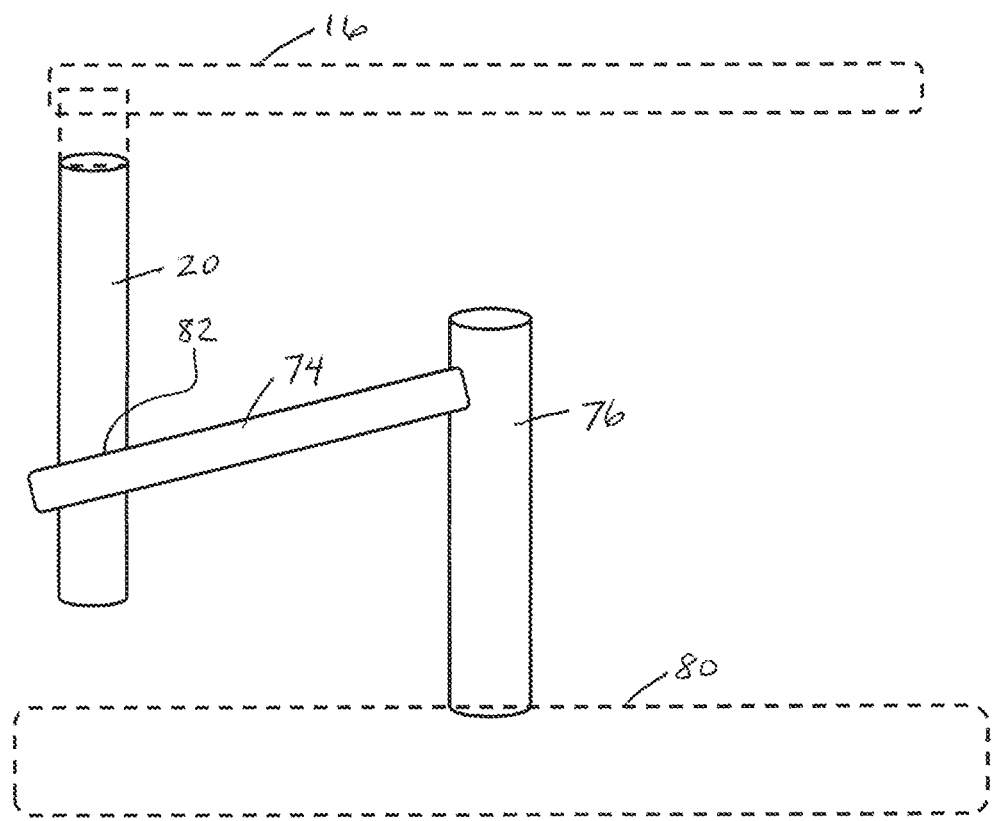
FIG. 3 is a schematic depiction of another food processing system drive assembly.

For the purpose of such a machine 10, a drive assembly 70 (shown schematically in FIG. 2) is provided to convert the planetary movement of the output shaft 20 into rotation of the processing tool shaft. In particular, the assembly 70 includes a ring-shaped coupler 72 connected to a crank arm 74 that is fixed to a processing tool shaft 76. The coupler 72 engages the orbiting and rotating output member/shaft 20 that extends down from the underside of the mixer head 16 in a manner that allows the shaft 20 to freely rotate within the coupler. An internal bearing system could be provided on the coupler 72 for such purpose. The orbiting movement of the shaft 20 about axis 78 rotates both the crank arm 74 and the processing tool shaft 76 about the stationary vertical axis 78. A processing component 80 connected to the shaft 76 is rotated by the shaft 76. The processing component may be fixed to the shaft or removably connected to the shaft. The processing component (e.g., shredder plates, slicing plates, or chopping blades, etc.) may be changed out as needed for the particular food processing operation that is required. For this purpose, the processor attachment 56 of the assembly 50 may be removably connected to the processor section 54 and/or to the bowl yoke arms 24. As an alternative to the ring-shaped coupler 72, the coupler could be formed by a drive surface 82 at the end of the crank arm, where the crank arm extends outward from the shaft 76 and into the orbital path of the shaft 20 (see FIG. 3).

Referring again to FIG. 1, a food processing tool controller (e.g., part of control board 100) may be configured to keep track of information related to the following variables: type and/or identity of food processing accessory section utilized (RFID, magnetic or other identifiers are provided on the accessories, with one or more sensors 110, 112 on the machine to identify which tool component is attached); number of cycles—number of cumulative cycles—cumulative time of operation for each particular food processing tool or accessory; power consumption profile or load profile—quantity indicative of power consumption profile and power consumption profile change over number of cycles, or number of hours of operation—for each particular food processing tool component 56. Load sensors of the drive control unit 104 may be used for load detection, or separate load sensors could be provided. Sensors 110, 112 could be any of RF code readers, magnetic code readers or optical code readers. The machine controller could also automatically limit the manner in which the drive motor is operable based upon identify of the tool component that is attached (e.g., automatically limit drive motor speed to one or several speeds).

In a machine of the foregoing type, or potentially other food machine configurations, a system is provided with drive motor, sensors, changeable food processing tools and a controller configured to perform a variety of food preparation/food processing functions according to the food type and/or processing function being carried out.

Sensors utilized may include an electric current sensor 115, a voltage sensor 116, a power consumption sensor 118, a motor speed sensor 120, a motor position sensor 122, a motor acceleration sensor 124, planetary position and speed sensors 126, output shaft position and speed sensors 128, or others. During the food processing/food preparation operation of the machine, the machine will perform the steps described below (e.g., the controller of the machine is configured to cause the steps to be implemented).

A Human Machine Interface (HMI) 114 is provided on the machine, enabling the controller to display, or otherwise communicate, the state of a specific food processing tool component.

A database of baseline food processing tool component information for each component enables load based control specific to each tool. Separate load profile(s) for each food processing tool is provided, and multiple load profiles for each tool may be maintained (e.g., one load profile for a given tool when the tool is used to carry out operation on food type 1, another load profile for the given tool when the tool is used to carry out operation on food type 2, etc.). By way of example, Table 1 below is representative of such profile tracking, where specific operations for given tools (e.g., Op7-1 and OP7-2 for tool 1234567) have specific corresponding load profiles (e.g., ProfX1 and ProfX2). Notable from this table is that different tool components could have different numbers of corresponding load profiles.

TABLE 1

| Load Profile Database by Component and Operation | | | | |
|---|---|---|---|---|
| Component ID | Operation Profile | Operation Profile | Operation Profile | Operation Profile |
| 1234567 | Op7-1 | Op7-2 | N/A | N/A |
| | ProfX1 | ProfX2 | N/A | N/A |
| 1234568 | Op8-1 | Op8-2 | Op8-3 | N/A |
| | ProfY1 | ProfY2 | ProfY3 | N/A |

Table 2 below shows an example of a drive motor operating parameter control table that can be used to establish permissible operating parameters for the machine drive motor based upon tool component identity.

TABLE 2

| Drive Motor Parameters By Component | | | |
|---|---|---|---|
| Component ID | Motor Speed Options | Motor Speed Profiles | Max Load |
| 1234567 | S1, S4 | P1, P2, P5 | L1 |
| 1234568 | S1, S3 | P2, P5 | L2 |

In operation, the controller detects which food processing tool is connected to the machine by way of the identifier detection described above. The tool identifier also indicates which type of food processing operation will be implemented. A load profile for the operation is retrieved from memory based on the tool identifier. In some implementations, some or all of the food processing tool/fixtures may have multiple stored load profiles according to different tasks and/or food products for which the specific food processing tool/fixture is utilized and selection of the proper load profile may be further dependent upon information input via user interface of the machine (e.g., operator selection of a specific program, operator input/selection of a specific food type, etc.). Once the operation is initiated, the controller continuously senses and calculates actual load (e.g., mechanical and/or electrical power) on the machine during the operation, and continuously compares actual load to the selected predetermined load profile in order to responsively vary the action of the electric motor (e.g., varies motor speed) to compensate for load differences in excess of or outside of the selected load profile.

Figure 4:
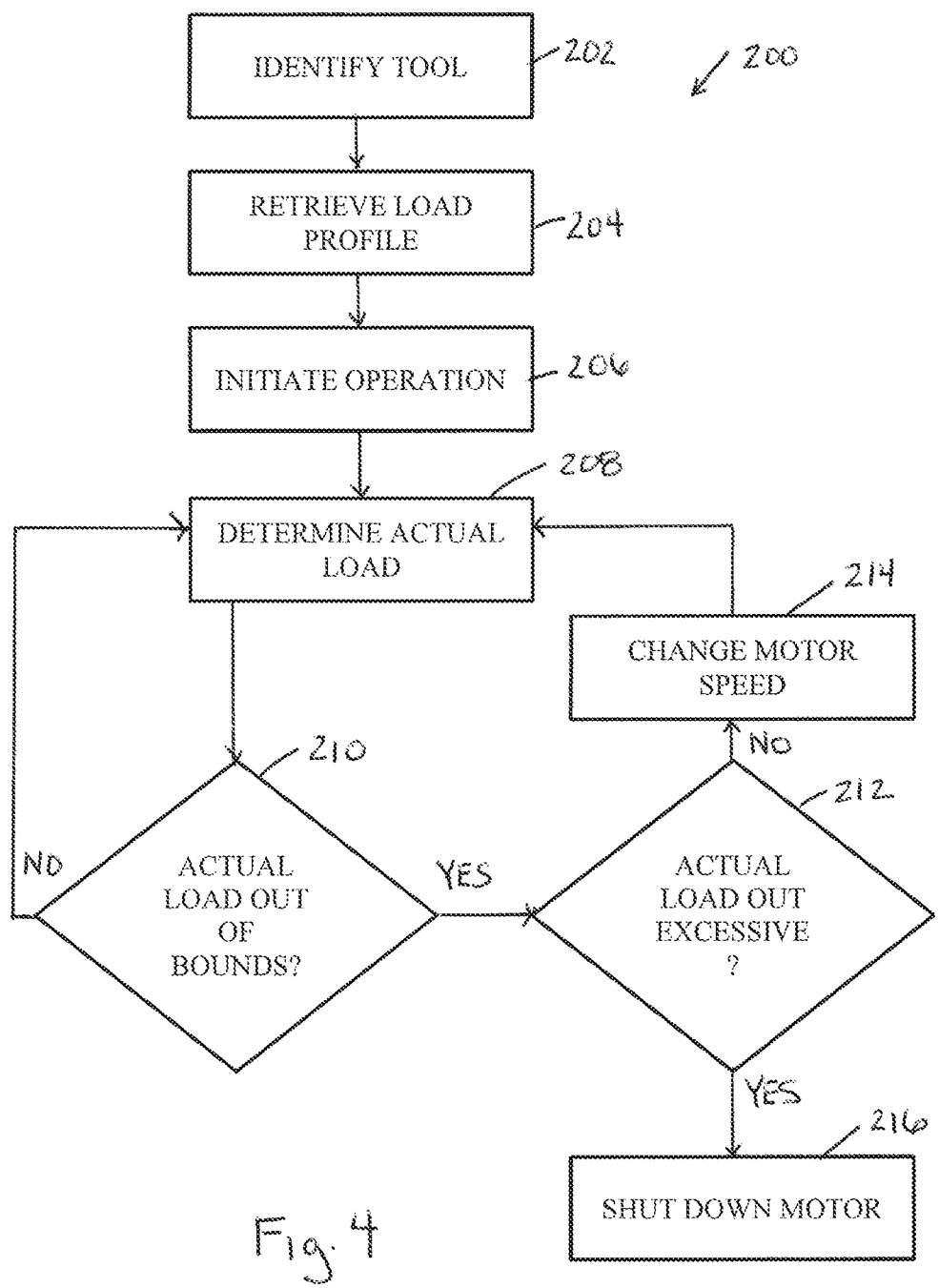
FIG. 4 is a control logic diagram.

FIG. 4 is exemplary of a control logic diagram 200 by which the controller controls the drive motor in such a manner. In step 202, the tool is identified and in step 204 the load profile is retrieved. The load profile may be a single constant load target or limit per FIG. 5A, or a moving load target or limit per FIG. 5B. At step 206, the drive motor is turned on and at step 208 the actual motor load is determined (e.g., readings from one or more sensor(s) taken and actual load calculated). At step 210, a determination is made if the actual load is out of bounds (e.g., below the target load by at least a set amount or above the target load by at least a set amount). If so, a check is made at step 212 to determine if the actual load is excessively high (e.g., above the target load by an excessive amount or above an upper load limit that is higher than the target load). If not, motor speed is adjusted in step 214 to bring the actual motor load closer to the target load (e.g., speed up motor if actual load is low or slow down motor if actual load is high). However, if the actual load is too high at step 212, the drive motor is shut off at step 216 to avoid a critical machine failure.

Figure 5A:
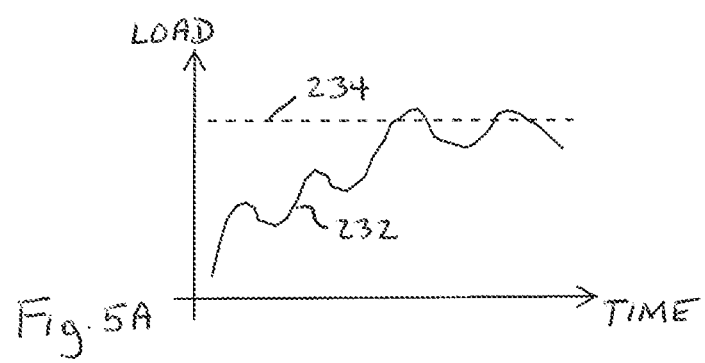
FIGS. 5A-5B show one example of motor speed control based upon load profile.
Figure 5B:
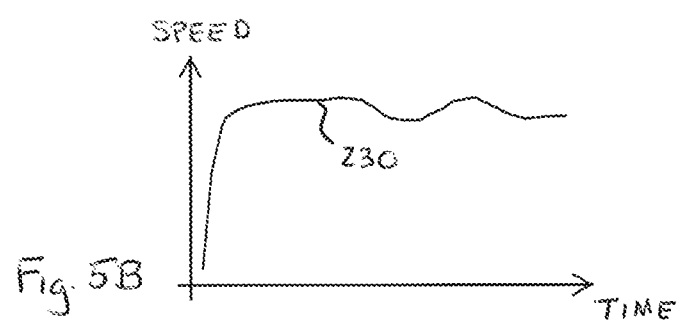

Per FIGS. 5A and 5B, the controller may be configured to gradually ramp down motor speed 230 to bring actual load 232 within a desired load profile 234 (here is a flat line profile) rather than making a sharp or immediate step adjustment. Per FIGS. 6A and 6B, the motor speed 240 may also be controlled to match actual load 242 to a target load profile 244 that changes over time.

The objective of the machine is primarily twofold. First, to continue to deliver food preparation/food processing function albeit at a reduced rate to protect the machine (electric motor, inverter drive, transmission, shafts, etc.) if the electrical or mechanical power consumption exceeds the prescribed load profile for a specific food preparation function associated with a given tool/fixture. Second, to interrupt food preparation/food processing function if a condition indicative of excessive power consumption requires this to protect the food machine from imminent damage or significantly shortened life if the electrical or mechanical power consumption exceeds the prescribed load profile by a predefined factor or margin.

It is to be clearly understood that the above description is intended by way of illustration and example only, is not intended to be taken by way of limitation, and that other changes and modifications are possible.

What is claimed is:

1. A food processing machine, comprising:
a head extending over a bowl receiving location, the head including an output shaft driven in a planetary manner;
wherein at least a first food processing tool and a second food processing tool can be changed in and out of the machine to be driven by the output shaft; and
a tool detection system including at least one sensor for detecting whether the first food processing tool or the second food processing tool is mounted on the machine;
a controller associated with the sensor, the controller including a memory with stored load profiles, and the controller configured to select a stored load profile that is linked to the detected food processing tool;
wherein the controller is configured to monitor at least one actual load condition during machine operation with the detected food processing tool and to compare the actual load condition with the stored load profile.

2. The food processing machine of claim 1 wherein each food processing tool includes an identifier thereon and the at least one sensor detects the identifier.

3. The food processing machine of claim 2 wherein each identifier comprises an identification code and the sensor is a code reader.

4. The food processing machine of claim 3 wherein each identification code is one of an RF identification code, a magnetic identification code or an optical identification code and the code reader is one of an RF code reader, a magnetic code reader or an optical code reader.

5. The food processing machine of claim 1 wherein a drive motor is linked to drive the output shaft, and the controller is configured to modify operation of the drive motor if the actual load condition is out of bounds relative to the stored load profile.

6. The food processing machine of claim 5 wherein the controller is configured to reduce a speed of the drive motor if the actual load condition is out of bounds on a high side.

7. The food processing machine of claim 6 wherein the controller is configured to increase the speed of the drive motor if the actual load condition is out of bounds on a low side.

8. The food processing machine of claim 6 wherein the controller is configured to stop motor operation if the actual load condition exceeds an upper load limit.

9. The food processing machine of claim 1 wherein the machine includes a user interface and the controller is configured to utilize an operator input through the user interface to select from among multiple stored load profiles for the identified food processing tool.

10. The food processing machine of claim 9 wherein the operator input is at least one of a program selection input or an input of food type to be processed.

11. The food processing machine of claim 1 wherein a drive assembly includes a coupler engaged with the output shaft to permit the output shaft to rotate freely about its moving axis, wherein the coupler is connected to a crank arm that extends to the food processing tool drive shaft.

12. A food processing machine, comprising:
a head extending over a bowl receiving location, the head including an output shaft driven in a planetary manner;
a first food processing tool removably connected to be driven by the output shaft and carrying a first identification code;
a coupler engaged with the output shaft to permit the output shaft to rotate freely about its moving axis, wherein the coupler is connected to a crank arm that extends to a drive shaft of the food processing tool;
at least one sensor to detect the first identification code of the first food processing tool;
a controller associated with the sensor, the controller including stored load profiles, and the controller configured to select a stored load profile that is linked to the identification code of the first food processing tool;
at least one load sensor, wherein the controller is configured to monitor at least one actual load condition indicated by the load sensor during machine operation and to compare the actual load condition with the stored load profile.

13. The food processing machine of claim 12 wherein a drive motor is linked to drive the output shaft, and the controller is configured to modify operation of the drive motor if the actual load condition is out of bounds relative to the stored load profile.

14. The food processing machine of claim 13 wherein the controller is configured to reduce a speed of the drive motor if the actual load condition is out of bounds on a high side.

15. The food processing machine of claim 14 wherein the controller is configured to increase the speed of the drive motor if the actual load condition is out of bounds on a low side.

16. A food processing machine, comprising:
a head extending over a bowl receiving location, the head including an output shaft driven in a planetary manner;
wherein multiple food processing tools can be changed in and out of the machine to be driven by the output shaft, wherein each of the multiple food processing tools carries an identification code; and
a tool detection system including at least one sensor for detecting the identification code of one of the food processing tools that is mounted on the machine;
a controller associated with the sensor, the controller including a memory with stored load profiles, and the controller configured to select a stored load profile that is linked to the identification code of the one of the food processing tools;
wherein the controller is configured to monitor at least one actual load condition during machine operation with the one of the food processing tools and to compare the actual load condition with the stored load profile.

* * * * *